Figure 1:
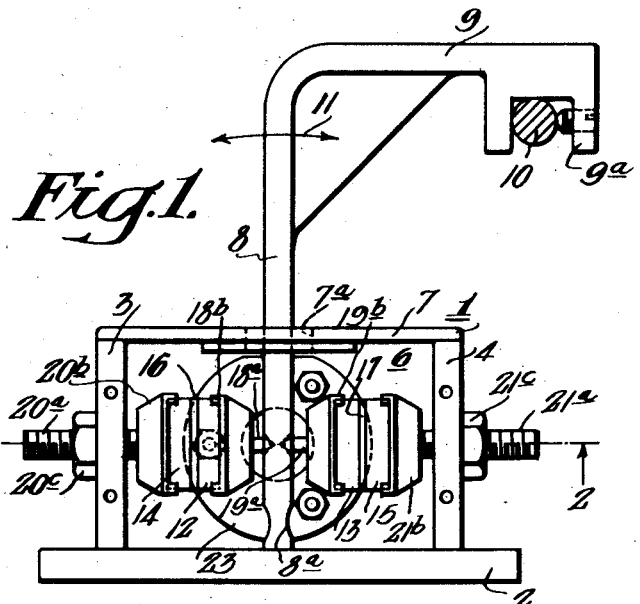

March 3, 1942.  J. A. FRIED  2,275,256

PIEZOMETER

Filed Nov. 30, 1939

INVENTOR
Joseph A. Fried
BY
ATTORNEY

Patented Mar. 3, 1942

2,275,256

UNITED STATES PATENT OFFICE 2,275,256

PIEZOMETER

Joseph A. Fried, Haddon Heights, N. J., assignor to Radio Corporation of America, a corporation of Delaware Application November 30, 1939, Serial No. 306,859

7 Claims. (Cl. 171—327)

This invention relates to piezo-electric apparatus and particularly to apparatus for measuring instantaneous and/or continuously variable forces by utilization of the piezo-electric properties characteristic of certain crystalline substances, such, for example, as quartz, tourmaline, Rochelle salt, etc.

Piezometers employing one or more piezo-electric crystals have heretofore found useful application in the study of pressure, and time-pressure phenomena. The prior art as to this is well exemplified in U. S. Patent No. 2,096,826 to Schrader and in U. S. Patent No. 1,930,905 to Nicolson.

The Schrader piezometer, when used in connection with suitable indicating means (such, for example, as a cathode ray oscillograph), is well suited for the study of forces of a single sign (positive) but is not suitable for producing an equally accurate indication of a force or forces of both positive and negative signs. By way of example: the Schrader piezometer is designed to accurately indicate the intensity and duration of an explosion, such as one resulting from the ignition of a vapor charge in the cylinder of an internal combustion engine, but does not produce an equally accurate indication of the conditions obtaining in that cylinder when the pressure therein is less than atmospheric pressure. It thus may be said to be adapted to produce a "unilateral indication," only.

The piezometer of the Nicolson patent employs an oscillating crystal the frequency of which is altered by variations in the clamping force applied to the said crystal by the device under test. Since an increase or decrease in the force applied to the crystal is indicated by a corresponding change in its frequency of oscillation a "bilateral indication" is achieved. However, the extent or range of the indications produced is limited not by the elastic limits of the piezo-electric crystal employed but by the very much more limited ability of the crystal to sustain oscillation when subject to a clamping force.

Accordingly, the principal object of the present invention is to provide a piezometer capable of producing an accurate indication of reciprocating or bilateral forces and one wherein the intensity of the forces applied thereto and the accuracy of the indication produced thereby are limited substantially only by the elastic limits of the material constituting the piezo-sensitive elements of the device.

Another object of the invention is to provide an accurate, simple, inexpensive and trouble-free piezometer employing a non-oscillating quartz crystal and one wherein bilateral sensitivity is achieved without the use of springs or similar elastic auxiliary loading elements.

Figure 2:
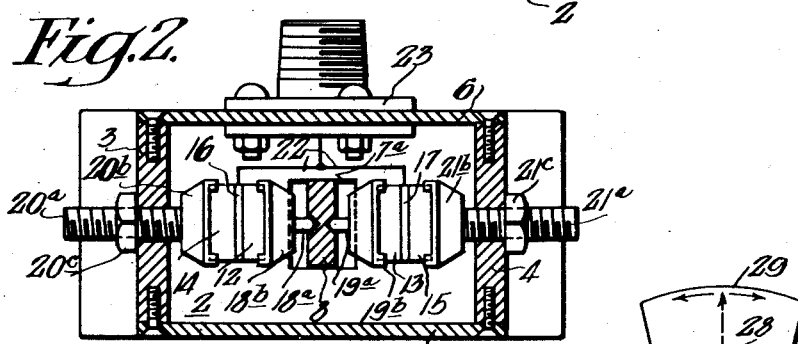
Figure 3:
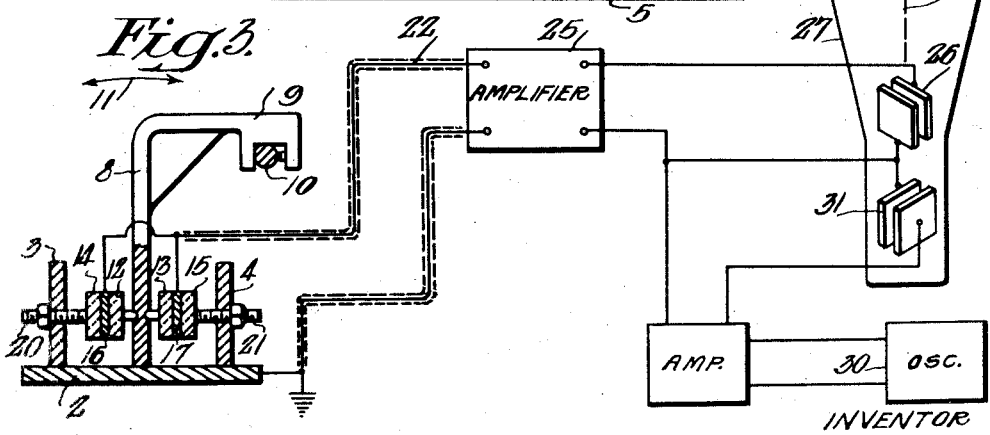

Other objects and advantages will be apparent and the invention itself will be best understood by reference to the following specification and to the accompanying drawing, wherein:

Figure 1 is a side elevational view, with one wall of the housing removed, of a piezometer constructed in accordance with the principle of the invention, Figure 2 is a sectional view taken on the line 2—2 of Fig. 1, and Figure 3 is an electrical diagram showing a simplified view of the instrument of Fig. 1 in circuit with an amplifier and cathode-ray oscilloscope.

In the drawing wherein like reference characters represent the same or corresponding parts in all figures, 1 designates generally a housing or box comprising a base 2, a pair of end walls 3 and 4, a pair of side walls 5 and 6 and a lid or cover 7. The box 1 is preferably of rugged construction and may be constituted in its entirety of metal. Secured to the center of the base as by welding or otherwise is a vertical arm or contact member 8 which is constituted of steel or other relatively flexible metal and which may be of reduced cross section adjacent its base, as indicated at 8a, whereby its flexibility at that area is enhanced. The arm 8 extends through an orifice 7a provided for the purpose in the cover plate 7 and is preferably provided at its free end with a longitudinal extension 9 which may terminate in a bifurcated or other suitably shaped part 9a capable of receiving a vibrating rod, shaft or other part 10 which will be understood to comprise, or to be coupled to, the machine or other device whose vibrations or other forces are to be studied. Obviously, any eccentric movement of the coupling or shaft 10 will serve to flex the contact arm 8 in the opposite directions indicated by the arrows 11.

Movement of the arm 8 to the left, as viewed in all figures, results in the application of a compression force to a piezo-electric unit which may comprise a pair of piezoelectric elements 12, 14, an interposed electrode 16, and a pair of crystal supporting members 18 and 20, respectively. The supporting member 18 may comprise a short rodlike member 18a, one end of which abuts the lever arm 8 and the other end of which terminates in a recessed head 18b within which the crystal 12 is seated. The support 20 for the other crystal of the pair may comprise a threaded bolt 20a which extends through the end-wall 3 of the housing and which may be secured against undesired movement with respect thereto by means of a nut 20c which abuts the outer surface of this wall. The bolt 20a, like the rod-like support 18a, is preferably provided at its inner end with a recessed head 20b in which one of the crystals, in this case the crystal 14, is seated.

A preferably duplicate piezo-electric unit comprising a pair of piezo-electric elements 13 and 15, an interposed electrode 17, a supporting rod 19, and a clamping bolt 21, is mounted within the housing 1 at the opposite side of the flexible lever or contact arm 8.

The piezo-electric elements 12, 14, and 13, 15 are each preferably constituted of quartz or of tourmaline, though they may comprise Rochelle salt crystals in cases where the intensity of the forces to be studied is not such as to require the use of the above mentioned physically stronger piezo-electric materials. In any event, these crystals, or at least one crystal of each pair, are so cut with respect to their natural crystalline axes (they may be X-cut) and are so mounted with respect to the interposed electrodes, 16 and 17, respectively, that when subject to compression forces of equal intensity, the electrode faces of the crystals contiguous one electrode (say, electrode 16) are of the positive (+) sign and the electrode faces of the crystals contiguous the other electrode (say, electrode 17) are of the negative (−) sign. When the supporting bolts 19 and 20 are properly adjusted, the compression forces applied to the crystals will ordinarily be of equal intensity when the lever or flexible contact arm 8 is in its untilted or unflexed position.

As shown more clearly in Figs. 2 and 3, the electrodes 16 and 17 for the oppositely polarized oppositely located crystals 12, 14, 13, 15 are electrically connected by a common lead 22 which extends through an insulating bushing 23 in the side wall 6 of the housing. The return or ground connection to the crystals is through the metal supports 18—21.

When the crystals are polarized and mounted in the manner above described, it will be apparent that when the contact arm 8 is moved or flexed to the left, it is brought selectively into operative relation with the crystal or crystals which are to the left of it. Thus, the mechanical force applied to the crystals 12 and 14 is increased and the clamping pressure on the crystals 13 and 15 is relaxed. The increase in pressure upon the crystals 12 and 14 results in an increase in the positive charge normally transferred to the electrode 16. The decrease in pressure upon the crystals 13 and 15 reverses the (negative) polarity of the charge normally transferred therefrom to the electrode 17. Since the electrodes 16, 17 have a common lead 22, the now electrically positive charge or voltage upon electrode 17 is added to that appearing upon electrode 16; hence the voltage in lead 22 is increased and the sensitivity of the device is augmented. When the contact arm 8 is moved or flexed to the right, the mechanical and hence the electrical charge appearing in the conductive connection 22 is reversed, that is, in this case, the sign of the voltage in that lead becomes negative (−). Obviously, in either case, the voltage flowing to ground through the metal supports is equal and opposite to that present in the electrode lead 22.

The sensitivity of the device may be further increased by the addition of more piezo-electric piles to each of the crystal piles 12, 16, 14 and 13, 17, 15. In such an obvious modification if the leads for the several electrodes are electrically separate they may be connected, if desired, to measuring instruments of different types. On the other hand, at some sacrifice in sensitivity, one of the crystals in each pile, say the piezo-electric crystals 14 and 15, may be omitted providing that suitable insulating mounting means are employed for preventing the charge on the remaining crystals from leaking to ground. The problem of mounting two discrete crystals, however, is not as simple as it might at first glance appear since the mount in addition to its insulating properties must be highly elastic; that is to say, it must be capable of being deformed and restored at a rate corresponding to the rate of deformation of the crystals themselves. A mount formed at least in part of a so-called Z-cut quartz crystal (i. e., one having little or no piezo-electric properties) would possess the requisite insulating and elastic properties.

In view of the foregoing, it is apparent that when at least two piezo-electric crystals are mounted on each side of the contact arm 8, in the manner above described, one crystal of each pair serves perfectly (because of its insulating properties) to prevent electrical leakage and is further usefully employed (by reason of its own piezo-electric properties) to increase the intensity of the electrical charge generated by the crystal adjacent thereto.

Referring to Fig. 3 which shows one manner in which the piezometer of Figs. 1 and 2 may be set up in adapting it to one of the numerous uses of which it is capable. In this schematic diagram it may be assumed that the rod or shaft 10 which is fitted within the bifurcated extension 9 of the contact arm 8 comprises the connecting arm of a U-shaped element or cradle whose upstanding arms are mechanically coupled to the opposite bearings of a rotor shaft for a motor or the like (not shown) which is to be examined in order to correct for any unbalance which may exist in the said shaft. In this case, where a single piezometer is employed, the bifurcated arm 9 may first be coupled to that end of the cross bar 10 of the cradle which is adjacent one bearing of the shaft under test. Now, if the common lead 22 for the electrodes 16 and 17 of the piezometer are connected as though an amplifier 25 to one pair of deflecting plates (say the vertical plates) 26 of a cathode ray oscilloscope 27 whose ray or beam 28 is normally directed across the screen 29 in a predetermined path (say a straight line) under control of a local oscillator 30 (whose frequency is preferably proportional to the speed of the shaft under test) then the voltage on the vertical deflecting plates 26 will cause the trace of the beam to depart from its normal pattern. Thus, if the voltage derived from the local oscillator 30 and applied to the other (horizontal) deflecting plates 31 is such as to cause the beam to normally trace a straight line upon the screen 29, then the presence of a voltage upon the plates 26 will be evidenced by a departure from straightness. The location of the irregularity in the pattern, i. e., whether the irregularity is above the line or below it, will indicate to the observer that the unbalance in the shaft under test is localized in one of the cross-sectional halves of the shaft. This half section may then be weighted temporarily (as with a pellet of clay of a weight sufficient to correct the unbalance). The piezometer may then be moved along the coupling 10 to a position adjacent the other bearing of the shaft under test and the test repeated. Obviously, two piezometers may be employed if desired to produce simultaneous indications of the condition of balance (or a comparative indication of any difference in torsional forces) adjacent the opposite ends of the shaft or other device under test.

In conclusion, it may be pointed out that where, as in the preferred embodiment of the invention, there are two crystals in each pile and the outputs of the two piles are connected to a common lead 22, any difference in the sensitivity (i. e., piezoelectric properties) in the crystals of a given pile will be relatively the same irrespective of the direction in which the actuating force (applied through arm 8) is applied.

Various modifications of the invention will suggest themselves to those skilled in the art. It is to be understood, therefore, that the foregoing is to be interpreted as illustrative and not in a limiting sense except as required by the prior art and by the spirit of the appended claims.

What is claimed is:

1. A pair of piezo-electric elements having oppositely located oppositely polarized faces, a movable contact member mounted between said oppositely polarized opposed faces, means for maintaining said elements under substantially equal pressure when said movable contact member is idle and means responsive to movement of said contact member in a given direction for increasing the pressure on one of said piezo-electric elements and simultaneously decreasing the pressure upon the other of said crystals.

2. A pair of piezo-electric elements each having oppositely polarized faces, means for mounting said elements under pressure in spaced relation, and means for selectively concomitantly inversely varying the pressure upon said piezo-electric elements whereby to increase the intensity of the piezo-electric charge appearing upon one polarized face of one of said elements and to change the sign of the piezo-electric charge appearing upon the other polarized face of said other element.

3. The invention as set forth in claim 2 and wherein the oppositely polarized faces of said piezo-electric elements are electrically connected.

4. In combination, a pair of piezo-electric crystal elements mounted in pressure transfer relation and having oppositely located, oppositely polarized electrode faces, and pivotal means interposed between said electrode faces for concomitantly inversely varying the pressure upon said crystal elements.

5. In combination, a pair of piezo-electric crystal elements having oppositely located, oppositely polarized faces, and means including a lever interposed between said oppositely polarized faces for mounting said crystal in variable pressure transfer relation.

6. A piezometer comprising a base, a lever pivotally supported on said base, a pair of piezo-electric units mounted in pressure transfer relation with respect to and on opposite sides of said lever, each of said units comprising a pair of quartz crystal elements and an interposed electrode, the electrode faces of the crystals of one unit being oppositely polarized with respect to the corresponding electrode faces of the other unit, and an electrical connection between the said electrodes of said piezo-electric units.

7. The invention as set forth in claim 2 and wherein said mounting means comprises a medium having a modulus of elasticity corresponding substantially to that of said piezo-electric elements.

JOSEPH A. FRIED.